March 8, 1932.   D. S. JACOBUS   1,848,565
FURNACE AND METHOD OF OPERATING THE SAME
Filed Sept. 18, 1925    3 Sheets-Sheet 2
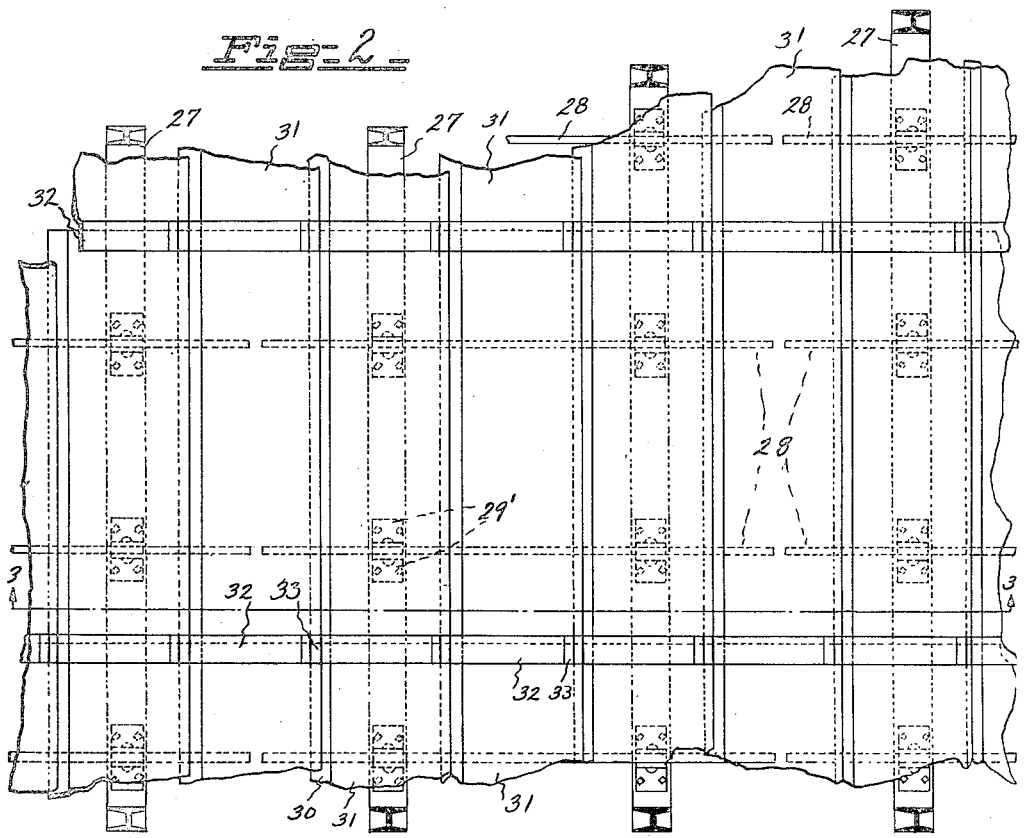
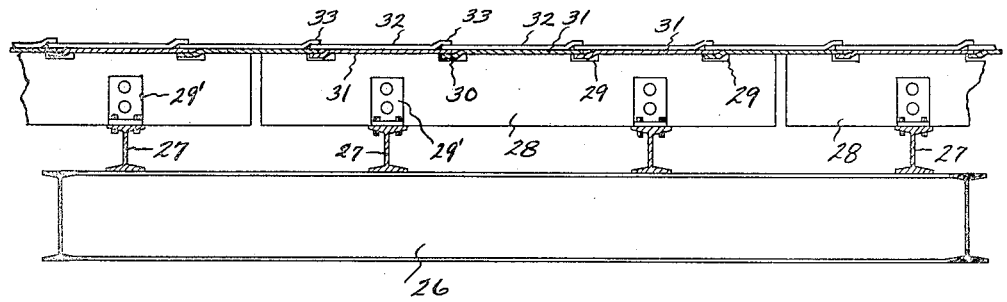
INVENTOR
David S. Jacobus
BY
Gifford & Hull
ATTORNEYS

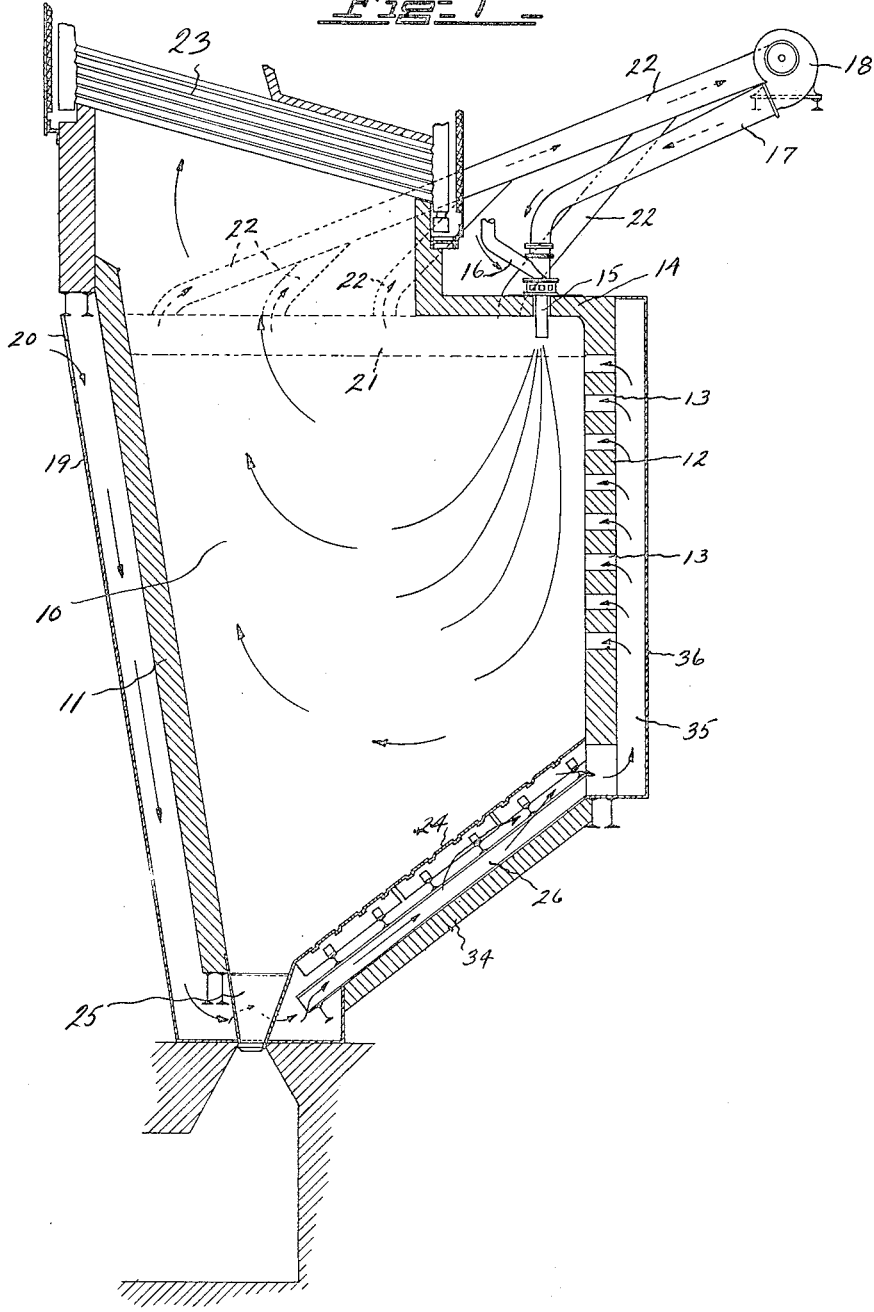

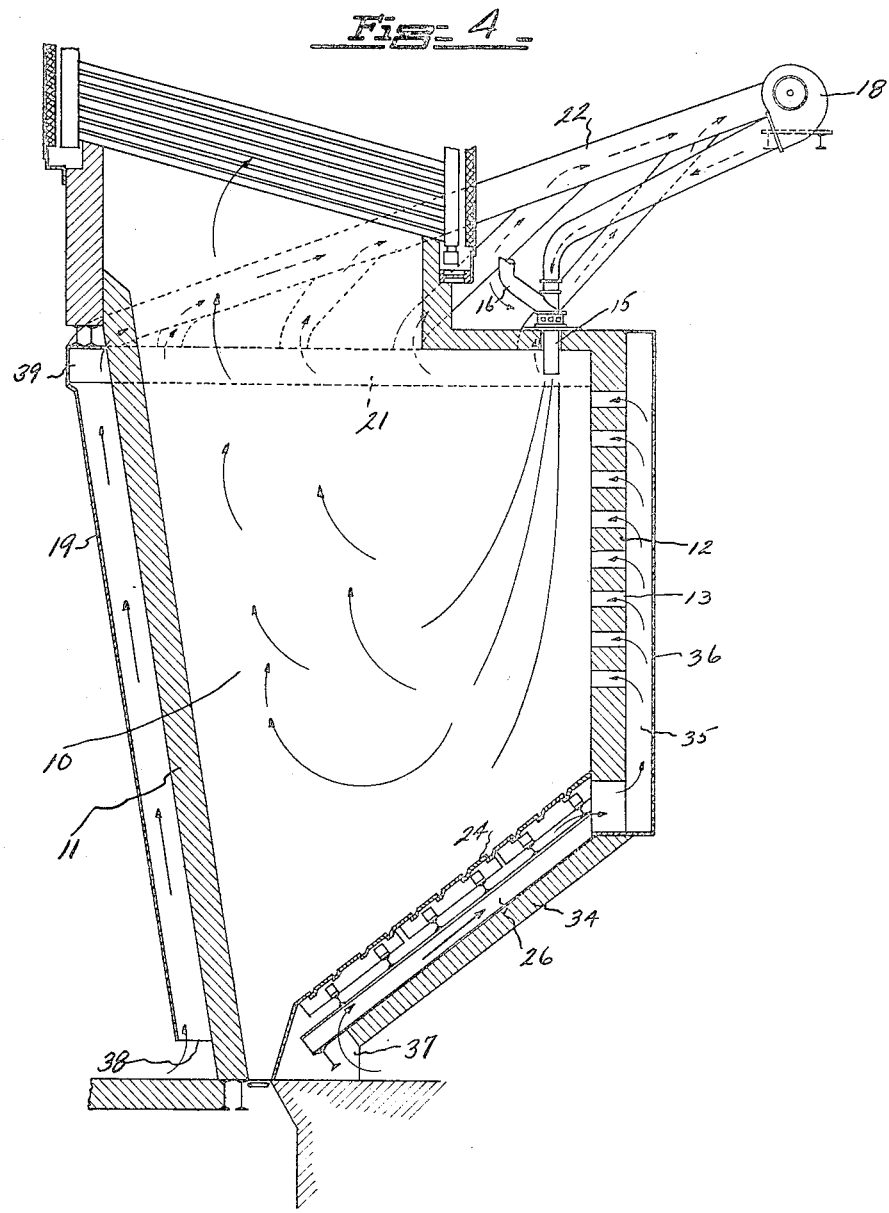

Patented Mar. 8, 1932

1,848,565

UNITED STATES PATENT OFFICE

DAVID S. JACOBUS, OF MONTCLAIR, NEW JERSEY, ASSIGNOR, BY MESNE ASSIGNMENTS, TO FULLER LEHIGH COMPANY, A CORPORATION OF DELAWARE

FURNACE AND METHOD OF OPERATING THE SAME

Application filed September 18, 1925. Serial No. 57,065.

My present invention relates to furnaces, and particularly such furnaces when equipped for burning powdered fuel or the like, and will be best understood from the following description and the annexed drawings, in which Fig. 1 shows a vertical section of an illustrative embodiment of my invention; Fig. 2 is a plan view of an enlarged section of the furnace bottom or floor shown in Fig. 1; Fig. 3 is a section on the line 3—3 of Fig. 2, and Fig. 4 is similar to Fig. 1, showing a modification.

In the arrangement shown in Figs. 1, 2 and 3, the furnace chamber 10 has a rear wall 11 and a front wall 12, the latter being provided with a plurality of air inlet openings 13. A part of the furnace chamber 10 is roofed over at 14 and is provided with one or more downwardly projecting pulverized fuel nozzles 15 to which the fuel is supplied through the pipe 16 and combustion air through the duct 17 from a fan 18.

The rear wall is provided with an outer casing 19 to provide an air passage into which air enters through the opening or openings 20. The side walls of the furnace chamber may be supplied with a plurality of vertical air ducts leading into a common header 21 and connected through ducts 22, 22 with the fan 18. Above the gas outlet from the furnace chamber is positioned a steam boiler indicated at 23.

The furnace bottom, indicated generally at 24, is air cooled from beneath and is also maintained at a lower temperature than it would be if the incandescent roof 14 extended completely over the furnace, because of the cooling influence of the lowermost rows of boiler tubes. It is important in the use of this arrangement that there be a proper amount of cooling action of the boiler tubes on the furnace and in the design shown the lowermost rows of boiler tubes are exposed for substantially their entire length to the radiant heat of the furnace.

The furnace bottom 24 is preferably set at an angle so that any material collecting thereon will slide into hoppers 25 and from thence into an ash removal opening.

Preferably the bottom 24 is made of metal and is air cooled so that the particles of molten slag projected downward out of the burning fuel system will be cooled by radiating their heat to the relatively cool floor 24, by passing through a relatively cool zone above the floor 24, and also by contacting therewith, so that the individual particles will be chilled and will not agglomerate into a solid mass, these particles then sliding down the floor 24 into the hoppers 25.

The floor 24, in the form illustrated, is made up of a number of relatively thin metal plates arranged in courses shinglewise with their longitudinal and end edges overlapping to provide a relatively tight floor and, at the same time, to enable each plate to expand and contract without interference from its neighbor and so as to keep the joints between the several plates substantially closed.

A plurality of fixed beams 26 forms the main support for the furnace bottom, these beams being provided with cross beams 27 to which, in turn, is fastened a plurality of relatively thin vertically disposed plates 28 attached by angles 29' to the beams 27. Preferably these plates 28 are comparatively short and spaced end to end to provide a continuous support from the front toward the rear of the furnace chamber.

Each of the plates 28 is provided with a plurality of notches 29 into which extend the downwardly bent edges 30 of the plates 31, each edge portion 30 resting against a side of a recess 29 to keep the corresponding plate 31 from sliding down the plate 28. The adjacent edge of another plate 31 extends over the downwardly-turned portion 30 to provide a lap joint, so that the plates 31 can expand widthwise without interference with each other. Similarly, one end of each of the plates 31 is bent upward to form the projection 32 overlapping the end edge of the adjacent plate in the same course extending across the floor 24 and, in order to complete the joint, this upwardly-turned portion 32 is further upwardly turned, as at 33, to overlap the upwardly-turned portion 32 of the plate in the next adjacent course.

By the arrangement described, each of the plates 31 is held against gravity in the notches 29 and the side and end edges of adjacent plates are bent so as to provide overlapping joints in both directions, so that each plate can expand in any direction without breaking the joints at the meeting edges of the several plates.

In the arrangement shown in Fig. 1, the air coming through the opening 20 passes down along the rear furnace wall 11 and between the hoppers 25 into the space between the masonry floor 34 and the metallic floor 24, the air flowing upward into the space 35 between the front wall 12 and the casing 36, and from thence into the air inlet openings 13 to mingle with the incoming fuel stream. The air, in its passage in contact with the rear wall and the furnace bottom, becomes heated, and this heat is returned to the furnace chamber by the heated air. By arranging the beams 26 and the plates 28 in the manner shown, what constitutes substantially a plurality of parallel ducts is provided beneath the floor to insure a substantially uniform flow of air from the lower part to the upper part of the floor. The cross beams 27 serve to direct some of this air against the lower part of the floor 24. It will also be understood that there is a certain amount of air leakage through the joints between the several plates 31, and this air entering the furnace chamber serves to insure a cooling zone adjacent the furnace bottom 24.

The incoming fuel stream from the nozzles 15 is ignited and heated air is supplied thereto through the openings 13. The fuel stream has a curved path and the slag particles are projected downward into the cooling zone above the floor 24 and into contact with the cooled floor 24 and are thus chilled into several particles which slide down into the hoppers 25. Additional heated air derived from the cooling of the side walls, is delivered to the nozzles 15 by the fan 18.

The arrangement shown in Fig. 4 is the same as that shown in Fig. 1, except that the air passing beneath the furnace bottom 24 is not first heated by flowing along the rear furnace wall, but is taken directly from the atmosphere through the opening 37. The rear furnace wall 11 is cooled by drawing air through the opening 38, from whence it flows upward into the header 39, and from thence into the cross header 21 to the fan 18, to be delivered to the burners 15, together with the heated air used to cool the side walls of the furnace chamber.

It will be understood that the arrangement which I have illustrated may be widely varied without departing from my invention and that, while the illustrated arrangement is suitable for carrying out my method, many other arrangements may also be used to carry out my invention.

I claim:

1. The method of operating a powdered fuel furnace which comprises projecting the fuel into the furnace chamber, igniting the fuel, passing air along the outside of at least one of the furnace walls to cool the same and then beneath the furnace bottom to produce a relatively cool zone above the furnace bottom to chill the slag particles from the fuel before they strike the furnace bottom, and then passing such air into the furnace chamber.

2. The method of operating a powdered fuel furnace which comprises projecting the fuel into the furnace chamber, igniting the fuel, passing air along the outside of at least one of the furnace walls to cool the same and then beneath the furnace bottom to chill it to a temperature that will prevent the slag particles from the fuel forming a coherent mass on the furnace bottom and then passing such air into the furnace chamber.

3. In a powdered fuel furnace, a combustion chamber having a sloping metallic floor comprising a plurality of relatively thin plates arranged in courses and a plurality of fixed sloping supporting members extending at right-angles to said courses, one of the edges of each plate in each course being bent downward beneath and overlapping the adjacent edges of the plates in the adjacent course, and said supporting members having recesses to receive said bent-down edges and to contact with said edges to prevent the plates from sliding down said sloping supporting members, and means for passing cooling air beneath the floor.

4. In a powdered fuel furnace, a combustion chamber having an inclined substantially continuous metallic floor made of a plurality of plates having expansion joints therebetween, said floor forming the upper wall of a duct, and means for discharging air into said duct, whereby said air as it passes through the duct will contact directly with said floor on the under side thereof to cool the same.

DAVID S. JACOBUS.